Feb. 12, 1957 L. E. FROST ET AL 2,780,966
ROUTER LUBRICATION ARRANGEMENT
Filed April 6, 1953
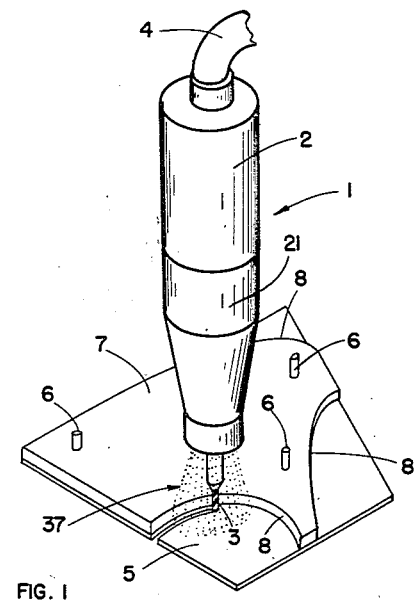
FIG. 1
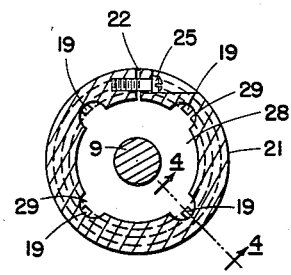
FIG. 3
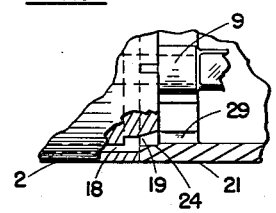
FIG. 4
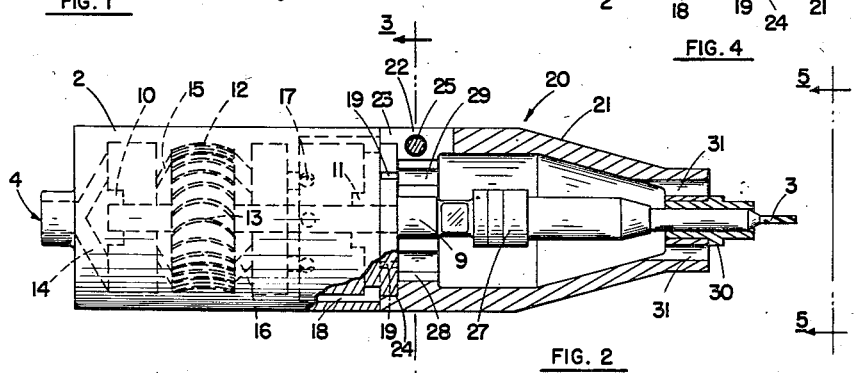
FIG. 2
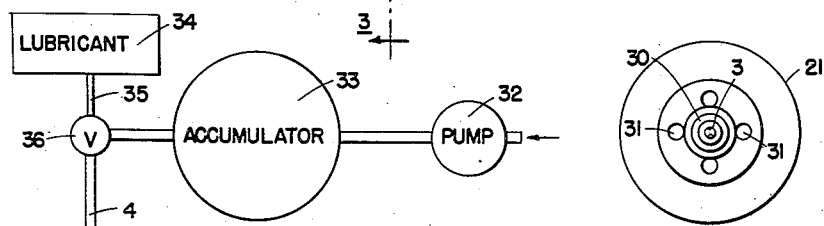
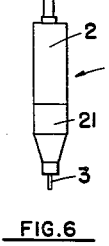
FIG. 6
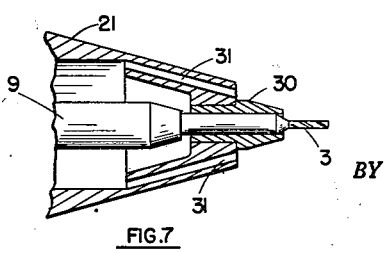
FIG. 7
FIG. 5
*INVENTORS*
LOUIS E. FROST
GEORGE J. MATEY
BY
ATTORNEY

United States Patent Office 2,780,966
Patented Feb. 12, 1957

2,780,966

ROUTER LUBRICATION ARRANGEMENT

Louis E. Frost, Torrance, and George J. Matey, Rolling Hills, Calif., assignors to North American Aviation, Inc.

Application April 6, 1953, Serial No. 347,096

3 Claims. (Cl. 90—12)

This invention pertains to a router lubrication arrangement and more particularly to a router lubrication arrangement which will provide support for a router bit and lubrication for the router bit and a workpiece engaged thereby.

Considerable difficulty has been encountered in the past in providing adequate lubrication for a router bit and a workpiece engaged by the bit. These router bits travel at extremely high speed, often in the neighborhood of 20,000 R. P. M. or even more, which makes lubrication of the rapidly spinning router bit a difficult matter. Normally an auxiliary lubrication line is brought to the vicinity of the router bit and a quantity of lubricant is sprayed from this line toward the router bit. However, such a source of lubricant does not provide lubrication on all sides of the router bit or surround the portion of the workpiece contacted by the router bit. Handling of the auxiliary lines may be an awkward operation. Another difficulty with the normal router design is that the router bit is unsupported near its extremity where cutting action takes place and thus where transverse loads are placed on the router bit. Efforts have been made to provide a bearing near this portion of the router bit but lack of adequate lubrication causes such bearings to rapidly deteriorate into uselessness. Even a permanently packed anti-friction type bearing does not adequately solve this problem due to the combined effects of the tremendous speeds of rotation and the small diameter of the router bit which is to be supported. Lack of a proper bearing support for the router bit plus spotty lubrication causes the router bit to run much hotter than desirable, decreasing the life of the bit. Routing of titanium, stainless steel and plastic impregnated glass cloth is generally not feasible with the usual design because of the rapidity with which the bits deteriorate.

Still another difficulty encountered in the normal router arrangement is that a router motor is very noisy and disturbing to the operator of the machine and other workers in the vicinity.

Therefore it is an object of this invention to provide an arrangement for lubricating a rapidly rotating router bit.

Another object of this invention is to provide an arrangement for supporting a router bit near the cutting portion thereof.

A further object of this invention is to provide an arrangement for muffling the sound of a router in operation.

An additional object of this invention is to provide an arrangement whereby air intake for an air powered router can be utilized to convey lubricant to the router bit.

A still further object of this invention is to provide an arrangement whereby all portions of a router bit and portions of a workpiece engaged by the router bit will receive an adequate quantity of a lubricant.

Another object of this invention is to provide an arrangement whereby all auxiliary lines may be eliminated in providing lubrication for a router.

Yet another object of this invention is to provide an arrangement whereby a receptacle receives the exhaust from a router motor and directs lubricant to the area around the router bit for providing lubrication.

Still another object of this invention is to provide an arrangement whereby a router bit will be adequately cooled.

These and other objects of this invention will become apparent from the following detailed description taken in connection with the accompanying drawings in which Fig. 1 is a perspective view of the arrangement of this invention during a routing operation, Fig. 2 is a side elevation, partially in section, of a router with an adapter, Fig. 3 is a sectional view taken along line 3—3 of Fig. 2, Fig. 4 is a fragmentary sectional view taken along line 4—4 of Fig. 3, Fig. 5 is an end elevational view of the adapter, Fig. 6 is a schematic view of the router system, and Fig. 7 is a fragmentary sectional view of a modification of this invention.

Referring to the drawings, router 1 is of the air powered type having a main body portion 2 adapted to support a rotatable router bit 3. Air intake line 4 connects with housing 2 for admitting compressed air into the router motor for rotating the router bit. As shown in Fig. 1 the router bit 3 is performing a cutting operation on a workpiece 5 which is held by pins 6 to a template 7, the latter being provided with edges 8 of a predetermined contour for guiding the router bit as it cuts. These elements are conventional and well-known in the art.

The workings of a typical air powered router are illustrated in Fig. 2. Such a router will include a rotatable shaft 9 suitably mounted on bearings 10 and 11. Secured to shaft 9 is a turbine rotor 12 which includes a plurality of turbine buckets 13. When such a router is to be operated air from intake line 4 passes through inlet ports 14 to the interior of the housing, and then through nozzles 15 from which it is directed against the buckets of turbine wheel 12. The expended air then passes through passageways 16 and 17 into exhaust passageway 18. As best seen in Fig. 4, passageway 18 opens into slot 19 in the end of the router housing which transmits the air to the exterior of the router housing.

Connected with one end of router 2 is adapter 20 comprising a portion of this invention, and which may be seen in section in Fig. 2. Adapter 20 includes a hood or receptacle portion 21 which attaches in any suitable manner to the end of the housing of the router motor. For example, this receptacle may be split at one end as indicated at 22 and include a projecting flange 23 adapted to fit over shoulder 24 of the router motor housing. Screw 25 is used to tighten flange 23 on shoulder 24 thereby to secure the receptacle portion to the end of the router motor yet permit easy removal thereof. Adapter housing 21 receives within its hollow interior an extension of router shaft 9 which further includes a chuck 27 for suitably mounting bit 3.

Inwardly spaced from flange 23 of housing 21 and surrounding the routing spindle of the router motor is an aperture 28 communicating with the interior of housing 21. This aperture is for the purpose of receiving the exhaust from the router motor. The router described herein includes exhaust slots 19 at the end of the router housing. Aligned with slots 19 are enlarged portions 29 of aperture 28 and these enlarged portions receive the exhaust from the motor and direct it via aperture 28 into the interior of housing 21.

The opposite end of housing 21 surrounds the router bit, but the router bit projects therefrom so that the cutting portion thereof is free to engage a workpiece. A centrally disposed aperture is provided in this end of housing 21 to allow the router bit to pass through the housing.

Secured within this aperture in any suitable manner is a bearing member 30 which may be of ordinary sleeve-bearing type. This bearing serves as a support for the router bit. Additional apertures 31 are provided in this end of housing 21 so as to surround bearing 30, opening in a direction substantially parallel with the axis of the router bit.

As shown schematically in Fig. 6, for operation of the router motor there is provided a suitable air compressor 32 which is connected to a reservoir 33 which serves as a storage means for compressed air. This air when passed through air inlet line 4 will operate the router motor causing rotation of shaft 9 and thus rotation of bit 3 as described above. In addition, a tank 34 is connected to a line 35, and through a valve 36 to inlet line 4. Tank 34 is adapted to retain a suitable lubricant such as a cutting oil.

When the router is operating valve 36 is opened so as to allow a relatively large quantity of oil or other lubricant to pass through line 35 into air inlet 4. It has been found that from approximately one hundred forty to about two hundred drops per minute of oil is adequate. This lubricant passes through this router with the air, serving to lubricate the moving parts of the router motor. The mixture of air and oil then exhausts from the motor through slots 19 entering housing 21 through aperture 28. Most of this air and lubricant will then pass from the housing through apertures 31 being thereby directed outwardly around the router bit so that all portions of the router bit are contacted by lubricant and so as to contact the portion of the workpiece surrounding the router bit. The high pressure air in passing through the router motor and the adapter will break up the lubricant into finely divided particles which are ideal for lubricating a rapidly rotating cutter such as a router bit. It provides a mist which will not be thrown from a rapidly rotating bit as with larger droplets which are not adequate for lubrication purposes. The path of the lubricant particles is indicated at 37 in Fig. 1.

An additional quantity of lubricant and air will pass through bearing 30 between the bearing and the router bit. Ample lubrication is thereby provided for this bearing and no difficulty is encountered from short bearing life or a tendency to burn out the bearing.

An additional beneficial effect is realized when the air exhaust passes out through adapter housing 21 because the exhaust will be muffled to a much lower noise level than is normally the case. This reduces fatigue of the operator of the router and generally makes working conditions more favorable.

The increased efficiency of lubrication from the techniques of this invention is especially important in routing stainless steel, titanium or similar material. Support for the router bit from bearing 30 also aids in routing such problem materials by preventing vibration and deflection of the router bit.

If desired as a modification of this invention apertures 31 which surround bearing 30 may be inclined slightly toward the axis of the router bit as illustrated in Fig. 7 rather than being parallel to the router bit as shown in Fig. 2. This will tend to direct lubricant toward the router bit so that an even larger quantity of lubricant will contact the router bit for providing lubrication thereof.

This invention has been found to be particularly useful in the routing of material which consists of layers of plastic impregnated glass cloth laminated together. A router bit used with such material is not properly lubricated or cooled with a cutting oil, and router bits used for such purposes have short life. Furthermore, oil tends to penetrate the pores of such material whereby it is difficult to remove after use. It also acts as a parting agent for paint or secondary bonding material used with the lamination. By the provisions of this invention the conventional cutting oil in reservoir 33 is replaced with water. When the router is in operation for routing a glass cloth lamination, the water is admitted into the air intake in the same manner as for the cutting oil as previously described. This water passes through the router motor with the air into the adapter and out through apertures to the area around the router bit cutting portion. In this manner a mist of water is applied to the router bit and the workpiece. This very effectively lubricates the router bit and a glass cloth workpiece so that a routing operation is possible without loss of router bit life. Water used in this manner does not corrode even the conventional router motor to an objectionable degree, and will actually lubricate the moving parts of the router motor the same as does the cutting oil. However, it is desirable when using water as a router lubricant to run oil through the router when a day's work has been completed and then store the router till its next period of use with the parts thereof immersed in oil.

Water used in this manner also provides good results in the routing of stainless steel and titanium.

It should be observed that router housing 2 as described in this invention includes an end exhaust whereby air passes out of the router housing from the same end as the location of the router bit. Many commercially available routers are manufactured with such an exhaust and for such routers adapter housing 21 need only be attached to the router housing as described above or in another suitable manner. However, where the router is provided with side exhaust it may be necessary to supply a new housing having an end exhaust such as that illustrated and described. Another possibility is to arrange the adapter so that it extends upwardly over the outside of the router housing to the location of the router side exhaust so that it can receive this exhaust and conduct it downwardly toward the router bit. The essential element in any event is to arrange the adapter housing so as to receive the exhaust from the router, to conduct this exhaust to a position near to and surrounding the router bit, and direct it downwardly from the router bit to the workpiece.

It should be clearly understood that the foregoing description is given by way of illustration and example only, the spirit and scope of this invention being limited only by the appended claims.

We claim:

1. A router comprising a housing, a pneumatically operated motor in said housing, said housing having an inlet for receiving a mixture of pressurized air and oil for driving said motor, said housing including a portion arranged in exhaust-receiving relationship with said motor for receiving air and oil therefrom, a bearing at the end of said portion of said housing engageable by exhaust therein, chuck means in said housing rotatable by said motor, said chuck means being disposed inwardly from said bearing and in substantial alignment with the axis of said bearing, and a bit having a shank and a cutting portion, said shank being rotatably supported by said bearing, extending into said housing therefrom and engaging said chuck means for rotation thereby, said cutting portion being disposed exteriorly of said housing adjacent said bearing, said portion of said housing having exhaust aperture means around said bearing for directing said air and oil to the vicinity of said cutting portion.

2. A router comprising a housing, a pneumatically operated motor in said housing, said housing having an inlet for receiving a mixture of pressurized air and oil for driving said motor, a drive shaft rotatable by said motor, bearing means in said housing rotatably supporting said drive shaft therein, chuck means rotatably carried by said drive shaft, said housing having a projecting portion in exhaust-receiving relationship with said motor extending around said chuck means to a location remote therefrom, a bearing in said projecting portion disposed outwardly with respect to said chuck means and engageable by exhaust in said projecting portion, a bit having a cutting portion and a shank extending from said cutting portion, said shank being rotatably supported in said lastly mentioned bearing and extending therefrom into said housing and into said chuck means for rotation thereby, said cutting portion of said bit being disposed exteriorly of said projecting portion of said housing adjacent said lastly mentioned bearing, said projecting portion having aperture means around said lastly mentioned bearing for permitting exhaust of air and oil from said housing in the vicinity of said cutting portion.

3. A device as recited in claim 2 in which said projecting portion is detachable from said housing for providing access to said chuck means, and said aperture means are formed by a plurality of spaced openings extending through said projecting portion along a circumference around said lastly mentioned bearing.

References Cited in the file of this patent

UNITED STATES PATENTS

| | | |
|---|---|---|
| 1,193,676 | Emerson | Aug. 8, 1916 |
| 1,611,028 | Harrison | Dec. 14, 1926 |
| 1,630,835 | Doyle | May 31, 1927 |
| 1,687,252 | Laessker | Oct. 9, 1928 |
| 1,979,537 | Elliott | Nov. 6, 1934 |
| 2,232,617 | Lease | Feb. 18, 1941 |
| 2,384,872 | Baker et al. | Sept. 18, 1945 |
| 2,452,268 | Schumann | Oct. 26, 1948 |